United States Patent [19]

Wagner

[11] 3,916,055
[45] Oct. 28, 1975

[54] ADHESIVE ATTACHMENT SYSTEM FOR DECORATIVE TRIM STRIPS

[75] Inventor: David P. Wagner, Elmhurst, Ill.

[73] Assignee: Illinois Tool Works Inc., Chicago, Ill.

[22] Filed: May 29, 1973

[21] Appl. No.: 364,769

Related U.S. Application Data

[63] Continuation of Ser. No. 145,368, May 20, 1971, abandoned.

[52] U.S. Cl............. 428/161; 24/73 FT; 24/73 HS; 29/475; 52/312; 52/716; 52/717; 52/718; 156/306; 156/310; 156/330; 156/272; 293/1; 293/62; 428/313; 428/346
[51] Int. Cl.².. B32B 3/00; B32B 5/28; B60R 13/04; A44B 21/00
[58] Field of Search ........ 29/475; 52/312, 716, 717, 52/718; 156/199, 216, 221, 272, 306, 310, 330, 313; 161/41, 43, 44, 119, 167; 293/1, 62; 428/161, 313, 346; 24/73 HS, 73 FT

[56] References Cited
UNITED STATES PATENTS

| | | |
|---|---|---|
| 2,650,185 | 8/1953 | Larson et al................... 156/313 X |
| 3,340,224 | 9/1967 | Sherman et al................... 260/41.5 |
| 3,451,709 | 6/1969 | Swauger................................. 293/1 |
| 3,471,355 | 10/1969 | Truesdell et al...................... 161/40 |
| 3,472,546 | 10/1969 | Samuels................................. 293/1 |
| 3,572,799 | 3/1971 | Truesdell et al........................ 293/1 |
| 3,606,431 | 9/1971 | Kunevicius............................. 293/1 |
| 3,703,434 | 11/1972 | Schaaf................................ 161/167 |
| 3,703,747 | 11/1972 | Hamman............................ 24/73 HS |
| 3,837,984 | 9/1974 | Wagner et al..................... 293/62 X |

Primary Examiner—Douglas J. Drummond
Assistant Examiner—Robert A. Dawson
Attorney, Agent, or Firm—Robert W. Beart; Thomas W. Buckman

[57] ABSTRACT

A trim attachment system utilizing thermoplastic adhesive to bond trim, clips, emblems, or the like, to a finished workpiece without utilizing apertures in the workpiece. The trim attachment may carry a layer of hot melt adhesive or the adhesive material may be produced solely by the isolated heating and reflowing of a thermoplastic paint on the workpiece.

4 Claims, 11 Drawing Figures

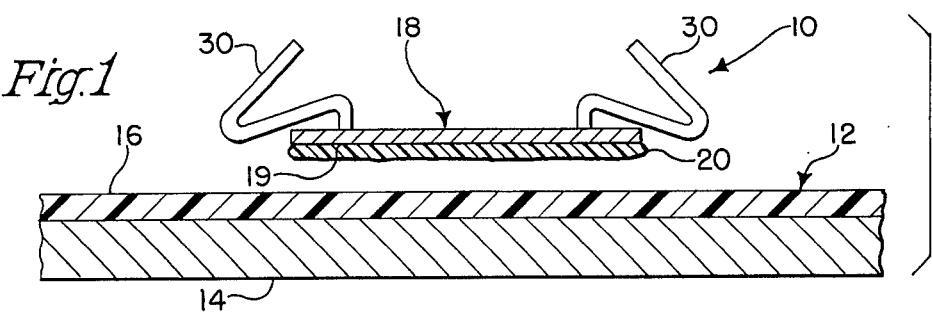
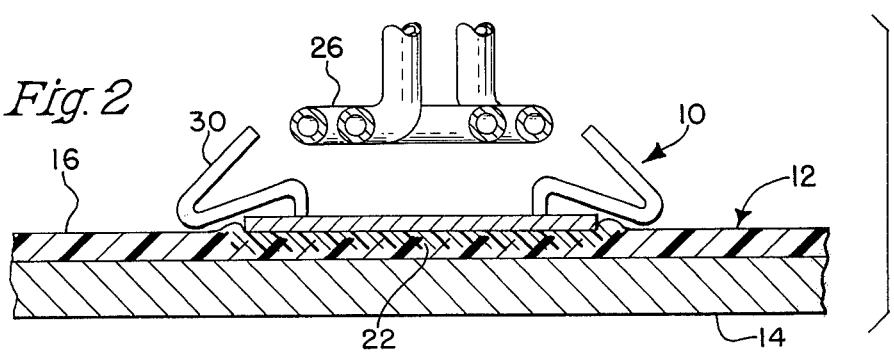
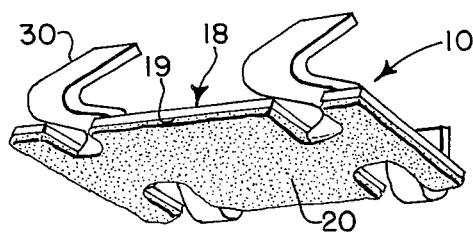
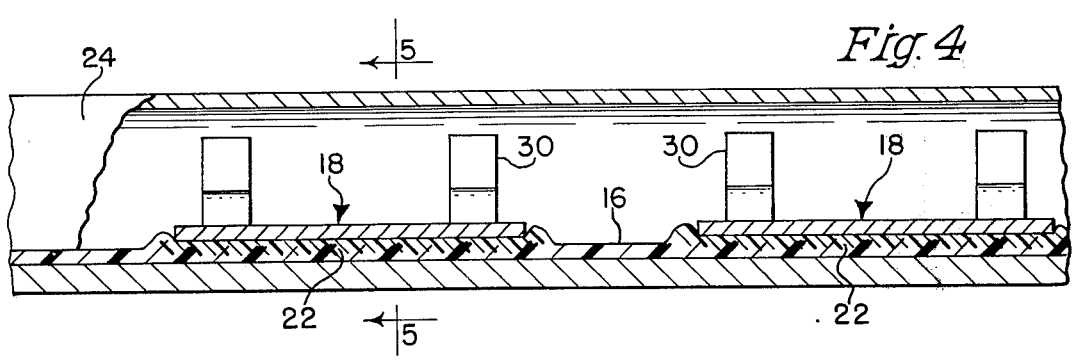
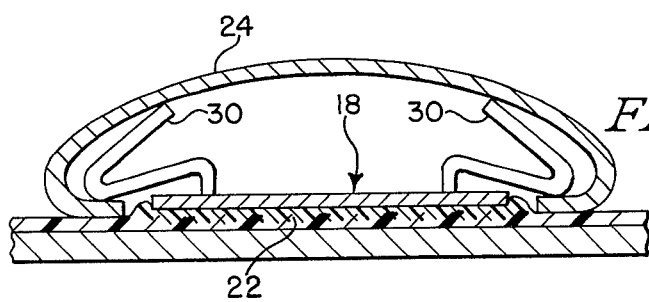
INVENTOR
David P. Wagner

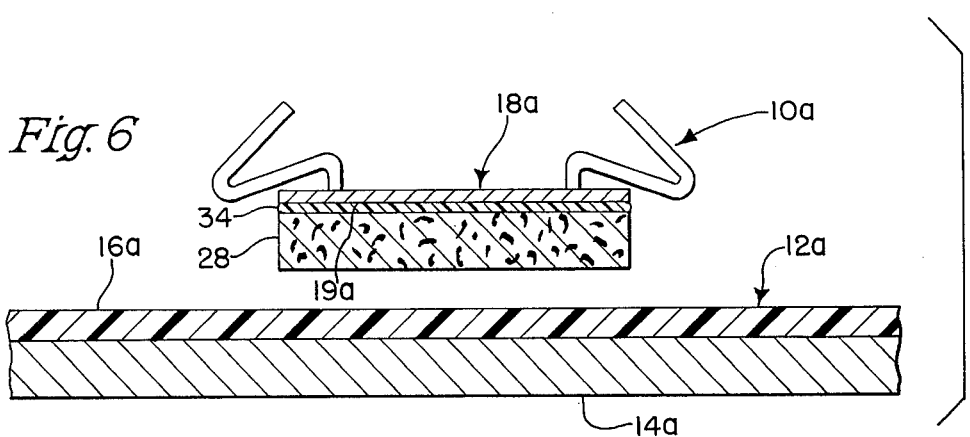
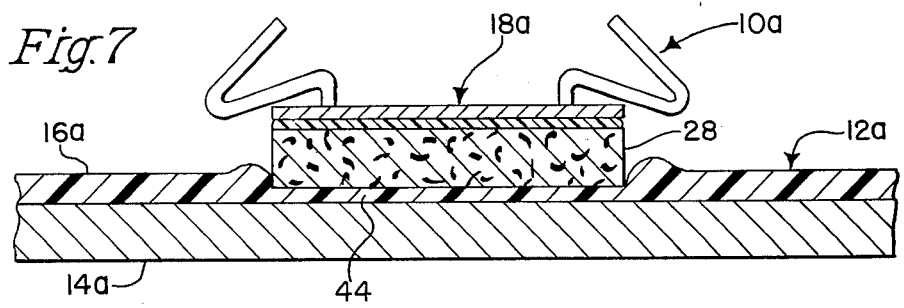
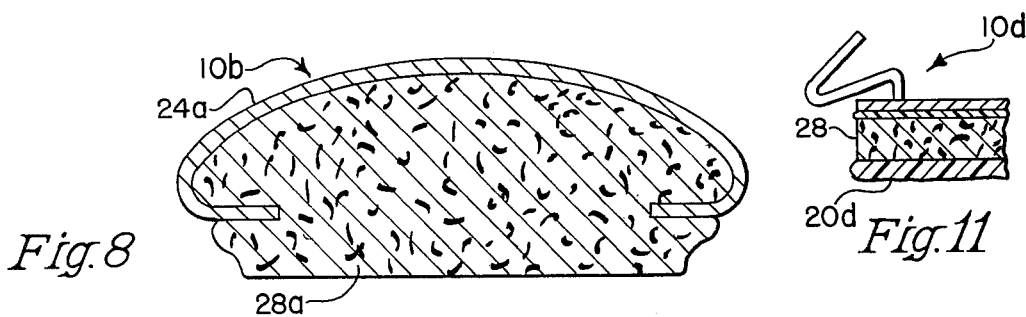
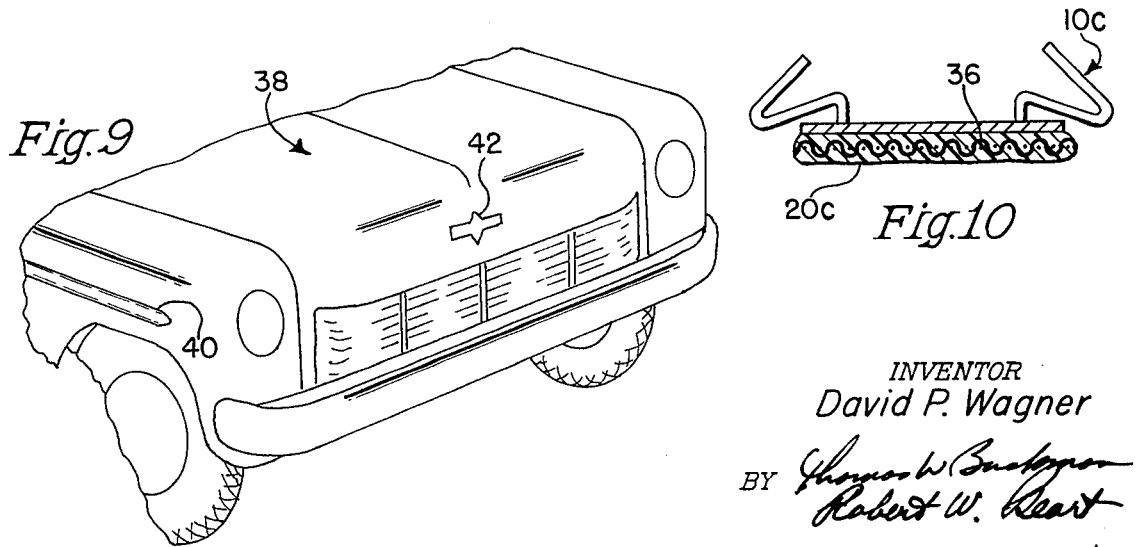

ADHESIVE ATTACHMENT SYSTEM FOR DECORATIVE TRIM STRIPS

This is a continuation, of application Ser. No. 145,368, filed May 20, 1971 and now abandoned.

BACKGROUND OF THE INVENTION

1. Field of the Invention

This invention relates to fastening systems and particularly to fastening systems utilizing thermoplastic adhesive.

2. Description of the Prior Art

Efforts to both efficiently and effectively trim automobiles or other articles primarily constructed on an assembly line basis have been many with numerous disadvantages inherent in each method. A popular manner of attaching trim to an automobile uses clips which are readily insertable in predrilled apertures. It has become relatively expensive to use such a method. The use of holes also creates a sealing problem which is not easily overcome and which subsequently results in rusting of the automobile body. Pressure sensitive adhesive tapes as in U.S. Pat. No. 3,543,465, have been utilized. These applications generally utilize a mastic, tacky adhesive surface which is difficult to store and handle. They may also utilize a releasable cover strip which necessitates additional operations prior to final assembly. Other efforts to produce a suitable trim attachment system without using holes in the workpiece have been directed towards welding prior to the finishing of the automobile. This method is represented in U.S. Pat. No. 3,188,730. Since the weld is done on a surface which is not finished, extra precautions and covering techniques are to be utilized during painting in subsequent steps on the assembly line. Difficulties in replacement and repair also arise in a weld system.

The preceding problems as well as the difficulty in arriving at a system which incorporates high peel strength to thwart accidental disassociation of trim from an automobile or vandalism is present in one form or another in prior art known to date.

SUMMARY

It is an object of this invention to provide a trim attachment system utilizing an adhesive bond between the trim and workpiece as the sole method of attachment.

It is a further object of this invention to provide an adhesive attaching system which results in a high strength bond on a workpiece which is prefinished.

An additional object of this invention is to provide an adhesive attachment system which is activated by selectively applying heat to appropriate areas of the fastening system.

It is still another object of the invention to provide an attachment system which utilizes, at least partially, the finish on the workpiece as the adhesive.

An important advantage of this invention is the provision of an adhesive attaching system of very high bond and peel strength approaching the strength of the bond of finish to a workpiece.

These objects and advantages are obtained by the system utilizing a workpiece prefinished with a suitable paint coat, a trim attachment member which may either be a molding clip or the trim itself and thermoplastic adhesive in a dry, nontacky state for ease of storage and handling. The adhesive may be activated through the use of an outside heat source applied to a selected area of the trim and/or workpiece.

One embodiment of the invention utilizes the trim member as a carrier having at least a partial coating of thermoplastic adhesive which is adapted to bond and-/or fuse with the finish on the workpiece.

Another embodiment of the invention utilizes the finish on the workpiece itself as the adhesive. A thermoplastic type paint is utilized on the workpiece and is selectively heated by an outside energy source as a trim member is placed in contact with a selected area on the workpiece.

Further embodiments of the invention utilize foam shock absorbing material placed between the trim member and the workpiece or may utilize a reinforcement member embeded in the thermoplastic adhesive carried by the trim member prior to attachment.

While all of the embodiments described herein may refer to an automobile, it should be apparent that the teachings found herein are equally applicable to the attachment of trim to other articles, such as appliances or the like. The techniques used in this invention are particularly responsive to the problems inherent in assembly line systems utilized by automotive and appliance industries.

BRIEF DESCRIPTION OF THE DRAWINGS

FIG. 1 is a transverse sectional view of a trim member carrying adhesive prior to bonding with a workpiece.

FIG. 2 is a transverse sectional view of the trim member in FIG. 1 as it is fused to the workpiece.

FIG. 3 is a perspective view of a trim member carrying adhesive material.

FIG. 4 is a side partial sectional view of trim attached to a workpiece using a plurality of clips.

FIG. 5 is a sectional view taken in the direction of arrows 5—5 of FIG. 4 showing the trim attached to the workpiece via molding clips.

FIG. 6 is a transverse sectional view of an alternative system utilizing a shock absorbing member attached to the trim member.

FIG. 7 is a transverse sectional view similar to FIG. 6 showing the bonding of the workpiece to the foam member utilizing the finish of the workpiece as the adhesive.

FIG. 8 is a sectional view of an alternate embodiment of the trim member shown in FIG. 6.

FIG. 9 is a perspective view showing various trim members attached to an automobile utilizing the teachings of this invention.

FIG. 10 is a sectional view of an alternate embodiment of the trim member showing reinforcement in the adhesive.

FIG. 11 is a sectional view of another alternate embodiment of the trim member of FIG. 6 showing a layer of adhesive carried by the foam material.

In FIG. 1 the attachment system is illustrated in connection with an adhesive carrying fastener 10. The composite fastener includes a molding clip 18 and a layer of adhesive 20. The adhesive is formed on a faying surface 19 which may be substantially planar. The clip may include protuberances or arms 30 for the eventual attachment of trim. The adhesive used in this invention is preferably of a thermoplastic or hot melt type which will soften when heated and harden when cooled. This type of adhesive advantageously provides a dry, nontacky fastener which is easily stored and handled.

This invention is most efficient when utilized in conjunction with a workpiece which has been prefinished with a thermoplastic type paint, one example of which is the acrylic class of paints. This type of finish has the property of softening upon application of a sufficient amount of heat and will harden when cooled. FIGS. 1 and 2 illustrate the invention when used in conjunction with such thermoplastic paints. The fastener 10, including a clip 18 carrying a thermoplastic adhesive on the faying surface 19, is placed adjacent a workpiece which has been finished with a thermoplastic paint. In FIG. 2 the fastener has been placed in contact with the workpiece 12, which includes a steel member 14 covered by a layer of paint 16. The clip may be positioned using any suitable means (not shown) while the heating unit 26 applies a desired heating level to both the fastener 10 and a predetermined area of the workpiece corresponding to the faying surface 19 of the fastener 10.

The heating unit 26 is illustrated in FIG. 2 as an induction type coil. Heating by induction appears advantageous to heating by conduction in that a predetermined area of desired flow of the thermoplastic paint associated with the faying surface of the clips may be more closely controlled while allowing the surrounding portion of the paint about the fastener body to remain solid.

It is important to note in FIG. 2 that the predetermined area of paint and the adhesive 20 fuse in area 22 directly beneath the clip 18. A somewhat homogeneous bond results from the substantially simultaneous flowing of both the adhesive 20 and the paint in the area 22. A bond substantially equal to the bond between the paint layer 16 and the metal 14 will result. This fusing of the adhesive and thermoplastic paint will thus appreciably increase the peel strength in the adhesive fastening system.

It has been found that a thermoplastic adhesive comprised of 50–80% by weight of a mixture of high molecular weight solid epoxy resins, 5–30% by weight of nitrile rubber and 2–20% by weight of phthalate ester is particularly effective in bonding metallic clips to a surface finished in thermoplastic paint.

The perspective view, FIG. 3, shows one form of a clip which may be used to carry the adhesive for securement to a workpiece. The clip 18 includes a plurality of spring-like arms 30 which emanate from a position other than on the periphery of the clip. This particular arrangement of the arms will lessen the tendency of the clip 18 to be peeled from the workpiece as a result of the force applied to the arms through the application of a conventional trim piece 24.

If desired, the trim 24 may be preassembled to a plurality of clips 18 and thereafter fastened, as a unit, to the prefinished workpiece. With this arrangement, the necessary heat may be applied directly to or through the composite trim-clip unit. The fusion of the adhesive 20 with the paint layer 16 may thus simultaneously occur on a plurality of fasteners as is shown in FIG. 4. The preassembly of clips and trim in this fashion will appreciably increase the assembly speed and may utilize a fixture (not shown) which arranges a plurality of heating coils such as coil 26 in FIG. 2 to register approximately with the plurality of clips 18 used in the composite unit.

Another embodiment of the invention utilizes a shock absorbing element between the clip and the workpiece. FIG. 6 shows a clip 18a which carries a foam-like shock absorbing material 28, such as urethane foam, secured to a faying surface 19a. This foam material may be preattached to the clip 18a by adhesive, glue, or other similar material or by mechanical means. In this manner, an easily handled and storable fastener is obtained. As shown in FIG. 6, the foam material 28 is attached to the clip 18a by a thin bond line 34. The fastener 10a is subsequently assembled to a workpiece 12a without the use of a thermoplastic adhesive carried by the clip.

The trim member or clip is attached by selectively heating and reflowing portions of the paint surface 16a. FIG. 7 shows this fastener unit 10a as it is brought into contact with the workpiece 12a. The partially reflowed or softened paint area 44 is brought in direct contact with an exposed faying surface on the foam material 28. This area 44 thus acts as the adhesive bonding the fastener 10a to the workpiece 12a upon cooling of the area 44. The use of isolated heating techniques, such as induction heating, enables the thermoplastic layer 12a to soften in only selected areas and will not deteriorate the outward appearance of the major portion of the surface of the workpiece.

The completely fastened system shown in FIG. 7 will thus provide for attaching trim to a painted workpiece adhesively without the use of discrete adhesive material. The system also safeguards against objectionable vibrations or loadings which may tend to disassociate the clip from a workpiece. The foam material 28 acts to absorb the shocks transmitted between the fastener 10a and the workpiece 12a.

A further embodiment of the invention utilizing the direct application of a foam material to selectively reflowed portions of the finish on a workpiece is shown in FIG. 8. A trim member 24a is shown to be associated with foam material 28a by foaming material in the interior of the trim member 24a. This will present a trim member with built-in shock absorbing material which may be attached to a workpiece similar to that described with reference to FIG. 7.

Yet another embodiment of the invention utilizes a reinforcing material, such as screen, membrane, or the like. FIG. 10 shows a screen-like metal or plastic material molded within a layer of thermoplastic material 20c. This fastener unit 10c will present a nontacky, easily handled unit similar to the fastener 10 described above. It may be attached in the same manner as described with reference to the fastener 10. A reinforcing material 36 will provide additional areas upon which the adhesive 20c may interlock and adhere. Thus, when the fastener 10c is associated with a workpiece in a manner similar to that described above, a bond which is more resistant to loading or shear forces is obtained.

While in most cases the thermoplastic finish of the workpiece will provide the adhesive bond between a foam-backed clip and a workpiece, it may be desirable to utilize a foam-backed clip with a nonthermoplastic paint. In these instances, a thin layer of thermoplastic adhesive 20d may be preapplied to the faying surface of the foam material 28. The clip 10d as shown in FIG. 11, may be applied to a workpiece by selectively applying heat to the adhesive 20d while contacting a workpiece. A shock resistant adhesively fastened trim member is thus described which is readily adapted for use with thermoplastic or nonthermoplastic paint.

It is apparent that there has been provided, in accordance with the invention, a system for attaching trim members adhesively to a prefinished workpiece that fully satisfies the objects and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. An adhesive attachment system comprising three elements, a carrier device, primary workpiece and secondary workpiece, the carrier device including fastener means to attach the secondary workpiece to the primary workpiece, said carrier device having a substantially planar faying surface provided with at least a partial coating of preapplied, dry, nontacky, thermoplastic adhesive material including screen-like reinforcement means embedded therein and providing areas of interlock within the adhesive coating and insuring a controlled bond line between the faying surface on the carrier device and a corresponding faying surface on the primary workpiece, at least one of the faying surfaces being a heat conducting material providing means for conducting and directing heat from an outside induction heating source to activate the adhesive material, thereby bonding the carrier device to the primary workpiece.

2. A fastening system for bonding trim to a workpiece including a carrier device, foam shock absorbing means attached to a surface of the carrier device, and a workpiece of heat conducting material, a thermoplastic finish paint layer on the workpiece, the foam shock absorbing means being adhered to the workpiece solely through the use of the thermoplastic finish layer as the heat activable adhesive bond line between the foam means and the workpiece, a predetermined area of the paint layer thus being softened by the induction of heat in the heat conducting workpiece to reflow and subsequently cool and set the predetermined area of the finish layer.

3. An adhesive attachment system in accordance with claim 1, wherein both the carrier device and primary workpiece are formed of heat conducting material to allow the use of induction heating to activate the adhesive through both the carrier device and primary workpiece.

4. A fastening system in accordance with claim 2, wherein an adhesive layer is provided between the shock absorbing means and the carrier device.

* * * * *